(12) United States Patent
Komura et al.

(10) Patent No.: US 6,810,153 B2
(45) Date of Patent: Oct. 26, 2004

(54) METHOD FOR ORTHOCORRECTING SATELLITE-ACQUIRED IMAGE

(75) Inventors: Fuminobu Komura, Westminster, CO (US); Kouji Ueda, Westminster, CO (US); Takashi Hino, Yokohama (JP); Takatoshi Kodaira, Yokohama (JP)

(73) Assignees: Hitachi Software Global Technology, Ltd., Westminster, CO (US); Hitachi Software Engineering Co., Ltd., Kanagawa (JP)

( * ) Notice: Subject to any disclaimer, the term of this patent is extended or adjusted under 35 U.S.C. 154(b) by 370 days.

(21) Appl. No.: 10/128,586

(22) Filed: Apr. 24, 2002

(65) Prior Publication Data

US 2003/0179950 A1 Sep. 25, 2003

Related U.S. Application Data

(63) Continuation of application No. 10/101,525, filed on Mar. 20, 2002, now abandoned.

(51) Int. Cl.[7] .............................................. G06K 9/32
(52) U.S. Cl. ..................... 382/295; 382/300; 382/100
(58) Field of Search ................................. 382/276, 278, 382/285, 286, 294, 295, 299, 300, 154, 100, 108, 109, 291; 348/143, 144

(56) References Cited

U.S. PATENT DOCUMENTS

| | | | | |
|---|---|---|---|---|
| 4,708,472 A | * | 11/1987 | Hofmann | 356/2 |
| 6,011,505 A | * | 1/2000 | Poehler et al. | 342/25 |
| 6,084,989 A | * | 7/2000 | Eppler | 382/293 |
| 6,393,163 B1 | * | 5/2002 | Burt et al. | 382/294 |
| 6,694,064 B1 | * | 2/2004 | Benkelman | 382/284 |

* cited by examiner

Primary Examiner—Yon J. Couso
(74) Attorney, Agent, or Firm—Crowell & Moring LLP

(57) ABSTRACT

A method is provided for the orthocorrection of a satellite-acquired image. This method can be applied even if ground control points are not set. Without propagation of an error throughout the image and also without needing an excessively large amount of calculations, the method makes it possible to correct ground-relief-associated distortions caused by the relief of a ground surface. According to the method, a plurality of control planes of different elevations are set relative to a control plane of a zero elevation of a reference rotating ellipsoidal earth model. A corrected image is divided into blocks by lattices of equal intervals. With respect to each of these blocks, distortion model formulas in the form of bilinear functions are determined for the respective control planes. Concerning each pixel position in the corrected image, two pixel positions in an observed image, which correspond to the elevation value of the pixel position in the block, are calculated by using distortion model formulas for two control planes which directly sandwich the value of elevation above and below the value in the corresponding block. By the value of elevation, the two pixel positions are linearly interpolated to determine the desired pixel position in the observed image.

2 Claims, 14 Drawing Sheets

METHOD FOR ORTHOCORRECTING SATELLITE-ACQUIRED IMAGE

BACKGROUND OF THE INVENTION a) Field of the Invention

This invention relates to an image processing method for correcting distortions in a ground image acquired from a satellite, and especially to a method for orthocorrecting distortions caused by the relief of a ground surface.

b) Description of the Related Art

Firstly, a description will be made about an image acquired by a satellite (satellite image) and the principle of its correction.

FIG. 6 is a simplified pictorial illustration of acquisition of an image by a satellite, and shows the satellite at numeral 1 and also depicts a ground surface 2 and a ground-surface scanning line 3.

In FIG. 6, the satellite 1 acquires an image of the ground surface 2 by detecting electromagnetic waves from the ground surface 2 with a sensor (not illustrated) mounted on the satellite 1 such that the sensor is directed downwardly. When the sensor is a line sensor, such as CCD, commonly employed as a satellite sensor, the sensor is arranged such that cells (sensor elements) which make up the sensor are arrayed in a row extending at a right angle relative to a flying direction L of the satellite 1. A range on the ground surface 2, which is observed at the same time by the sensor, is the ground-surface scanning line 3. The ground-surface scanning line 3 moves together with the satellite 1 in its flying direction L. As the satellite 1 moves, detection data by the individual cells are inputted in predetermined sampling cycles. The input timing of such detection data is the same for all the cells. The data over the entire ground-surface scanning line 3 are equivalent to a single line of satellite image. Accordingly, data equivalent to a single line of satellite image are acquired by a single input of data (single sampling). As the satellite 1 flies on an orbit, the ground surface 2 is continuously observed at constant swaths along scanning lines 3 as described above.

FIG. 7 is a view showing the principle of a correction of a satellite image obtained as described above. FIG. 7 depicts an observed image 4 and a corrected image 5.

In FIG. 7, the image acquired by the satellite as described above is transmitted as an observed image 4 to the ground. In the observed image 4, configurational distortions have been developed by causes such as fluctuations in the satellite orbit and attitude, distortions in an optical system of the sensor, and terrain on the earth's surface. To make good use of the image acquired by the satellite, it is hence necessary to correct these distortions in the observed image 4 and to convert it into a corrected image in accordance with a predetermined cartographic projection method. This correction is to perform mapping from a pixel A(p,l) in the observed image 4 into a pixel A'(x,y) in the corresponding corrected image 5. This mapping is called "mapping F".

The observed image 4 is represented by a p-l coordinate system, in which the arrayed direction of the cells in the sensor on the satellite 1 (in other words, the longitudinal direction of the ground-surface scanning line 3) is set as the p-coordinate axis while the traveling direction L of the satellite 1 is set as the l-coordinate axis. The corrected image 5, on the other hand, is represented by an x-y coordinate system, in which a direction corresponding to the p-coordinate axis of the observed image 4 is set as the x-coordinate axis while a direction corresponding to the l-coordinate axis of the observed image 4 is set as the y-coordinate axis.

FIG. 8 is a flow chart illustrating processing for the correction of the observed image 4.

In the corrected image 5 depicted in FIG. 7, pixels are arrayed and set at equal intervals. In the observed image 4, on the other hand, the positions of pixels corresponding to the individual pixels in the corrected image 5 are not arrayed at equal intervals for such distortions as described above. The correction illustrated in FIG. 8 is to find out, with respect to each pixel position in the corrected image 5, a pixel at a corresponding pixel position in the observed image 4 and to place the pixel at the relevant pixel position in the corrected image 5.

In FIG. 8, the correction consists of a distortion modeling step 100 and a resampling step 101. In the distortion modeling step 100, with respect to each pixel position in the corrected image 5, a corresponding pixel position is determined in the observed image 4. Referring back to FIG. 7, the position of the pixel A(p,l) in the observed image 4, said position corresponding to the position of the pixel A'(x,y) in the corrected image 5, is determined using a distortion model 6 prepared in advance. For this purpose, it is necessary to determine an inverse map $F^{-1}$ of the map F.

Here, the distortion model 6 is estimated, for example, from fluctuations in the orbit and attitude of the satellite, distortions in the optical system of the sensor and the like at the time of the capture of the observed image 4, or is obtained from the results of an observation or the like by the satellite.

When the position of the pixel A(p,l) in the observed image 4, said position corresponding to the position of the pixel A'(x,y) in the corrected image 5, is determined in the distortion modeling step 100, the routine then advances to the resampling step 101. In this step, the pixel intensity at the position of the pixel A(p,l) is determined and is used as a pixel intensity at the pixel A'(x,y) in the corrected image 5.

FIG. 9 is an illustration of the resampling step 101 in FIG. 8, and describes the resampling step 101 on the basis of the observed image 4 and corrected image 5 depicted in FIG. 7. Incidentally, numeral 7 designates the center positions of pixels (hereinafter called "pixel positions") in the observed image 4.

In the distortion modeling step 100 described with reference to FIG. 8, the position of the pixel A(p,l) in the observed image 4, said position corresponding to the position of the pixel A'(x,y) in the corrected image 5, was determined. As shown in FIG. 9, however, the thus-determined position of the pixel A(p,l) generally does not register with a pixel position 7 in data observed by a sensor. It is, therefore, necessary to determine the intensity of the data observed at the position of the pixel A(p,l) by interpolation from the pixel intensity or intensities at one or more pixel positions 7 actually obtained around the position of the pixel A(p,l). As an interpolating method for this purpose, an interpolation formula such as nearest neighbor, bilinear or cubic convolution is commonly employed.

As a first conventional correction method of satellite-acquired image data, said method being based on the above-described principle, specifically as an orthocorrection method, there is known, for example, the method described in Demystification of IKONOS by Thierry Toutin and Philip Cheng, Earth Observation Magazine, 9(7), 17–21, 2000. According to this method, the distortion modeling step 100 in FIG. 8 is represented by the following formula (1):

$$l = \frac{b(\text{Nth-order polynominal in } x, y \text{ and } z)}{a(\text{Nth-order polynominal in } x, y \text{ and } z)} \quad (1)$$

$$p = \frac{d(\text{Nth-order polynominal in } x, y \text{ and } z)}{c(\text{Nth-order polynominal in } x, y \text{ and } z)}$$

This formula is called "the rational polynominal method". Whenever an image is acquired, the coefficients in the polynominals in x, y and z are calculated and determined by using ground control points GCP as will be described hereinafter. By the formula (1) making use of the coefficients so determined, coordinate positions in the observed image 4, said pixel positions corresponding to the individual pixel positions in the corrected image 5, are determined.

FIG. 10 is an illustration of the first correction method making use of such ground control points.

In FIG. 10, a plurality of ground control points $G_i$ (i=1, 2, . . . ), for example, three ground control points $G_1, G_2, G_3$ are chosen in an observed image 4. These ground control points make it possible to clearly show shapes and positions in the observed image 4, and position coordinates in the corrected image 5, said position coordinates corresponding to the positions of these ground control points, can be correctly obtained by reading them from a map or by a survey. In the corrected image 5, the positions corresponding to these ground control points $G_1, G_2, G_3$ are designated as $G_1', G_2', G_3'$, respectively.

Once the plural ground control points $G_i(p_i, l_i)$ in the observed image 4 and their corresponding positions $G_i'(x_i, y_i, z_i)$ in the corrected image 5 are determined as described above, the unknown coefficients in the polynominals represented by the formula (1) can be determined by the least-square method from the pixel coordinates of these ground control points $G_i(p_i, l_i)$ and map coordinates of the positions $G_i'(x_i, y_i, z_i)$. As a result, inverse mapping $F^{-1}$ is feasible. Incidentally, the order of each polynominal should be set as needed depending on the number of the ground control points GCP and the extents of distortions.

This first method has a merit in that, insofar as elevation data DEM (digital elevation model) and ground control points in an observation target region are available, distortion modeling and correction processing making use of the distortion modeling are feasible even if neither the orbit data or attitude data of a satellite nor an optical model of a sensor of the satellite is available.

As a second conventional correction method of satellite-acquired image data, there is also known a so-called non-orthocorrection method, namely, a method that does not take into consideration a relief of elevations on the ground surface. This is a method relying upon a geometric model, which makes use of the orbit data and attitude data of a satellite and an optical model of a sensor of the satellite. This method is characterized in that a corrected image is divided into blocks by lattices of equal intervals and distortion model formulas are determined for the individual blocks, respectively.

FIG. 11 is a view for making an explanation on the division into blocks by the lattices in the second correction method.

In the corrected image 5 of FIG. 11, lattices 8 are set at equal intervals in both vertically and horizontally such that the corrected image 5 is divided into plural blocks 9 by the lattices 8. Pixel positions in the observed image 4 are put into groups by these blocks 9. The pixel positions in the observed image 4, which correspond to individual lattice points 10 where these lattices 8 intersect, are determined by inverse mapping $F^{-1}$, respectively. Lattices 13 are then set with lattice points 12 located at the thus-obtained pixel positions, respectively, so that the observed image 4 is also divided into blocks 11 by these lattices 13. By way of example, FIG. 11 illustrates that a lattice point A in the observed image 4 has been determined as a lattice point A' in the corrected image 5 by the inverse mapping $F^{-1}$ and that these lattice points A', A correspond to each other.

Every block 11 in the observed image 4 corresponds to any one of blocks 9 in the corrected image 5. Between the observed image 4 and the corrected image 5, the blocks 11 and the blocks 9 correspond to each other on a one-to-one basis. Incidentally, the blocks 9, 11 are set such that a distortion becomes approximately even in each block. Between adjacent blocks, however, distortions may be different. However, the inverse mapping $F^{-1}$ is set such that distortions continue at a boundary between each two adjacent blocks.

Here, bilinear functions represented by the following formula (2) are used for the inverse mapping $F^{-1}$.

$$l = a_0 + a_1 x + a_2 y + a_3 xy$$
$$p = b_0 + b_1 x + b_2 y + b_3 xy \quad (2)$$

The formula (2) consists of a $0^{th}$-order term in x and y, $1^{st}$-order terms in x and y, and a term in xy. Owing to this, distortions are made to continue at the boundary between each two adjacent blocks. If high-order terms of $x^2$ and $y^2$ and higher were included, a discontinuity (step) would occur at the boundary of each two adjacent blocks. To eliminate this discontinuity (step), it is necessary to add many terms of higher orders such that a calculation can be conducted regarding the whole image as a single block. This calculation, however, is very complex and is time-consuming. In this illustrated method, therefore, the images 4,5 are each divided into blocks of such a size as allowing to regard that a distortion is even in each block, and with respect to each block, bilinear functions are determined. By the thus-determined bilinear functions, the inverse mapping $F^{-1}$ is performed. It is, therefore, possible to perform the inverse mapping $F^{-1}$ by a simple formula like the formula (2). In this case, the addition of the term in xy as described above is to make distortions continue at the boundary between each two adjacent blocks.

FIG. 12 is a flow chart illustrating a method for calculating the coefficients $a_0, a_1, a_2, a_3, b_0, b_1, b_2, b_3$ in the above-described bilinear functions (2).

In FIG. 12, the calculation consists of a lattice-point calculation step 200 and a coefficient calculation step 201.

Describing the calculation on the basis of FIG. 11 as an example, the lattice-point calculation step 200 is to determine a coordinate position A(p,l) in the observed image 4, which corresponds to each lattice point A'(x,y) in the corrected image 5. For this determination, inverse mapping $F^{-1}$ is needed. As it is generally impossible to directly perform the mapping $F^{-1}$ without ground control points, the coordinate position A(p,l) is determined using the repetitive convergence computation of geometric calculation for the mapping F.

FIG. 13 is a flow chart illustrating the geometric calculation for the mapping F, and FIG. 14 is a view illustrating an array of some pixel positions in the observed image 4. Further, FIG. 15 is a simplified pictorial illustration for explaining the geometric calculation for the mapping F. The mapping F is to determine a lattice point A'(x,y) which corresponds to each coordinate point A(p,l). In FIG. 13, orbital data 14, attitude data 15, a sensor optical model 16 and pixel position data 17 correspond to the distortion model 6 in FIG. 8.

In FIG. 14, four pixel positions $A_1(p_1,l_1), A_2(p_2,l_2), A_3(p_3,l_3), A_4(p_4,l_4)$ are illustrated. Firstly taking the pixel position $A_1(p_1,l_1)$ as an example, the calculation illustrated in FIG. 13 will be described.

In FIGS. 13 and 15, from the coordinate $l_1$ of the pixel position $A_1(p_1,l_1)$, an acquisition time t of the pixel position $A_1$ is obtained (step 300). From the orbital data 14 of the satellite 1 and the thus-obtained acquisition time t, the position of the satellite 1 (satellite position) in an inertial space at the time of the acquisition of the coordinate $l_1$ is obtained (step 301). From the satellite position and the optical model 16 of the sensor on the satellite 1, the position of the optical center of the sensor (sensor optical center) 19 in the inertial space at the time of the acquisition of the coordinate $l_1$ is obtained (step 302).

Further, from the acquisition time t obtained in step 300 and the attitude data 15 of the satellite 1, the attitude of the satellite 1 (satellite attitude) in the inertial space at the time of the acquisition time t-is obtained (step 303). From the satellite attitude, the optical model 16 of the sensor and the pixel position data 17 (in this computation, the coordinate $p_1$ of the pixel position $A_1(p_1,l_1)$), a line-of-sight vector 22 to the pixel position $A_1(p_1,l_1)$—said line-of-sight vector 22 extending through a position 21 of a sensor element (in other words, a cell) in a sensor plane 20, said position 21 corresponding to the coordinate $p_1$—is determined in the inertial space (step 304). Obtained next is an intersection 24 between the line-of-side vector 22 extending from the sensor optical center 19 determined in step 302 and a ground surface model 23 (step 305). This intersection 24 represents the position of the pixel position $A_1(p_1,l_1)$ of the observed image 4 on the ground surface model 23 as indicated in terms of a latitude and a longitude. Based on the intersection 24, a coordinate A'(x,y) in the corrected image 5, said coordinate A'(x,y) corresponding to the pixel position $A_1(p_1,l_1)$, is determined by a calculation making use of predetermined cartographic projection 18. As the ground surface model 23, a rotating ellipsoid is generally employed.

However, the coordinate A'(x,y) determined to correspond to the pixel position $A_1(p_1,l_1)$ as described above does not register with the lattice point 10 set in the corrected image 5 (FIG. 11). Therefore, a pixel position adjacent to the pixel position $A_1(p_1,l_1)$ in FIG. 14, for example, the pixel position $A_2(p_2,l_1)$ is chosen, and with respect to this pixel position, a similar calculation is performed to determine, in the corrected image 5, a coordinate position A'(x,y) corresponding to the pixel position $A_2(p_2,l_1)$. If the thus-determined coordinate A'(x,y) still does not register with the lattice point 10 set in the corrected image 5, a further pixel position is chosen and a similar calculation is also performed. Then by setting a virtual pixel position in between the pixel positions actually observed by the above-selected cells in the sensor, a similar calculation is performed. By changing the location of the virtual pixel position, this calculation is repeated such that the results of the calculations converge at the lattice point 10 in the corrected image 5. The pixel position A(p,l) in the observed image 4, which corresponds to the lattice point A'(x,y) in the corrected image 5, is approximately determined, for example, by four to five calculations or so.

The above-described calculation is performed with respect to every lattice point 10 in the corrected image 5, so that pixel positions A(p,l) in the observed image 4, said pixel positions A(p,l) corresponding to the respective lattice points 10 in the corrected image 5, are obtained. The foregoing is the lattice-point calculation step 200 in FIG. 12.

In the coefficient calculation step 201 in FIG. 12, on the other hand, the coefficients $a_0, a_1, a_2, a_3, b_1, b_2, b_3$ in the bilinear functions represented by the formula (2) are determined for each block 9 in the corrected image 5 shown in FIG. 11. In short, bilinear functions are determined for every block 9.

As shown in FIG. 16, for example, assume that a block 11 in an observed image 4 corresponds to a block 9 in a corrected image 5. It is the coefficient calculation step 201 that determines bilinear functions to perform inverse mapping $F^{-1}$ of a pixel in the block 11 into the block 9. For this purpose, the coefficients $a_0, a_1, a_2, a_3, b_1, b_2, b_3$ in the formula (2) are determined by using the coordinates of lattice points at the four corners of these blocks 9,11.

Here, the lattice points $A_1'(x_1,y_1), A_2'(x_2,y_1), A_3'(x_2,y_2), A_4'(x_1,y_2)$ at the four corners in the block 9 correspond to the lattice points (pixel positions) $A_1(p_1,l_1), A_2(p_2,l_2), A_3(p_3,l_3), A_4(p_4,l_4)$ at the four corners in the block 11, respectively. Using the coordinate pairs $((x_1,y_1),(p_1,l_1)), ((x_2,y_1),(p_2,l_2)), ((X_2,y_2),(p_3,l_3)), ((x_1,y_2),(p_4,l_4))$ at the four corners in the blocks 9,11, simultaneous equations represented by the following formula (3), namely, $$l_1 = a_0 + a_1 x_1 + a_2 y_1 + a_3 x_1 y_1$$
$$p_1 = b_0 + b_1 x_1 + b_2 y_1 + b_3 x_1 y_1$$
$$l_2 = a_0 + a_1 x_2 + a_2 y_1 + a_3 x_2 y_1$$
$$p_2 = b_0 + b_1 x_2 + b_2 y_1 + b_3 x_2 y_1$$
$$l_3 = a_0 + a_1 x_2 + a_2 y_2 + a_3 x_2 y_2$$
$$p_3 = b_0 + b_1 x_2 + b_2 y_2 + b_3 x_2 y_2$$
$$l_4 = a_0 + a_1 x_1 + a_2 y_2 + a_3 x_1 y_2$$
$$p_4 = b_0 + b_1 x_1 + b_2 y_2 + b_3 x_1 y_2 \qquad (3)$$

are solved to obtain the desired coefficients $a_0, a_1, a_2, a_3, b_1, b_2, b_3$. By introducing the thus-obtained coefficients into the formula (2), bilinear functions for these blocks 9,11 are obtained. These bilinear functions express the pixel position in the block 11, said pixel position corresponding to the pixel position in the block 9. If the pixel position in the block 11 as expressed by the bilinear functions does not register with the pixel position actually observed by a cell of the sensor in the block 9, interpolation is obviously performed as described with reference to FIG. 9.

By performing the above-described coefficient calculation step 201 (FIG. 12) with respect to every block 9 in the corrected image 5, bilinear functions for the individual blocks 9 are obtained, thereby making it possible to perform the inverse mapping $F^{-1}$ from the observed image 4 into the corrected image 5.

This second method has the following merits:

(1) Because different bilinear models are used for the respective blocks, an error propagation caused by the least-squares method does not occur unlike the first method.

(2) Distortion models are continuous at the boundary between each two adjacent blocks.

(3) Owing to the use of the formula (3), the amount of computation in the calculation of position coordinates at the individual points in a corrected image is smaller compared with that required in the case of the polynominals of the formula (1).

(4) Modeling can be performed even if there are no ground control points.

(5) If ground control points are available, the accuracy of the modeling can be improved further by estimating errors, which may be contained in orbital data and attitude data of a satellite, on the basis of the ground control points and correcting the errors.

The first correction method, however, involves the following problems:

(1) Since ground control points are indispensable for modeling, the first correction method cannot be applied where no ground control points are available as in a region where no map or the like is ready for use.

(2) The accuracy of modeling is dependent on the number and arrangement of ground control points. Depending on their number and arrangement, the accuracy of estimation of the coefficients in polynominals may deteriorate, and especially, there is a potential problem that an error may propagate through points other than the ground control points.

(3) A calculation by the formula (1) is needed for each pixel of corrected images, leading to an increase in the amount of calculations for the correction.

The second correction method, on the other hand, has problems in that, because approximation is effected with a rotating ellipsoidal model that the ground surface does not roll, the second correction method cannot be applied directly to an orthocorrection which takes into consideration elevation data DEM of an observation target region and ground-relief-associated distortions caused by the relief of the ground.

With reference to FIG. 17, a description will now be made about ground-relief-associated distortions caused by the relief of the ground.

As is illustrated in FIG. 17, there is actually a rolled ground surface 25 as opposed to the ground surface model 23 of the rotating ellipsoid employed in the second correction method. A discussion will now be made about a cell $S_2$ in the sensor plane 20 upon acquiring the observed image 4 by the satellite 10 as described above. A coordinate obtained by expressing an intersection $P_1$ between the line-of-sight vector 22, which extends through the cell $S_2$ and the sensor optical center 19 determined as described above, and the ground surface model 23 in accordance with a predetermined cartographic projection method is set as a pixel position in the corrected image. To tell the truth, however, a coordinate obtained by expressing an intersection $P_2$ between a vertical line, which extends through an intersection $Q_2$ between the line-of-sight vector 22 and the rolling ground surface 25, in accordance with the predetermined cartographic projection method should be set as a correct pixel position in the corrected image. A positional offset on the corrected image, said positional offset being equivalent to the positional offset between $P_1$ and $P_2$, is called a "Ground-relief-associated" distortion $\delta$".

SUMMARY OF THE INVENTION

An object of the present invention is to solve such problems, and is to provide a method for orthocorrecting a satellite image without needing ground control points, without causing propagation of an error throughout the image and without making the amount of calculations excessively large while making it possible to correct ground-relief-associated distortions caused by the relief of the ground surface.

To achieve the above-described object, the present invention provides a method for orthocorrecting a satellite-acquired image, including distortion modeling for making positions of pixels in a corrected image and positions of pixels in an observed image correspond to each other and also resampling for interpolating intensities of the pixels in the observed image in accordance with results of the distortion modeling, wherein the distortion modeling comprises the following steps:

(a) setting a plurality of control planes of different elevations relative to a control plane of a zero elevation of a reference rotating ellipsoidal earth model;

(b) dividing the corrected image into plural blocks by lattices of equal intervals;

(c) determining, with respect to each of the pixels in the corrected image, a corresponding one of the blocks;

(d) determining two of the control planes, said two control planes sandwiching an elevation value of the position of the pixel above and below the elevation value in the thus-determined block;

(e) calculating two pixel positions in the observed image, which correspond to the elevation value of the pixel position in the block, by using respective distortion model formulas determined as bilinear functions with respect to the two control planes;

(f) linearly interpolating the thus-calculated two pixel positions by the elevation value of the pixel position in the corrected image to determine the pixel position in the observed image, which corresponds to the pixel position in the corrected image; and (g) repeating the steps (c) to (f) until pixel positions in the observed image are all determined corresponding to the individual pixel positions in the corrected image.

The method according to the present invention can bring about the following advantageous effects:

(1) Using the given elevation data DEM, ground-relief-associated distortions caused by the relief of a ground surface can be corrected.

(2) Because the different bilinear models are used for the respective blocks, an error propagation caused by the determination of model formulas by the least-squares method does not occur.

(3) Distortion models are continuous at the boundary between each two adjacent blocks.

(4) Modeling can be performed even if no ground control points are available.

(5) If there are ground control points, the accuracy of the modeling can be improved further by estimating errors, which may be contained in orbital data and attitude data of the satellite, on the basis of the ground control points and correcting the errors.

Owing to these advantageous effects, the method according to the present invention for the orthocorrection of a satellite image is practical in both accuracy and the amount of calculations.

DETAILED DESCRIPTION OF PREFERRED EMBODIMENT

The embodiment of the present invention will hereinafter be described with reference to the drawings.

Figure 1:
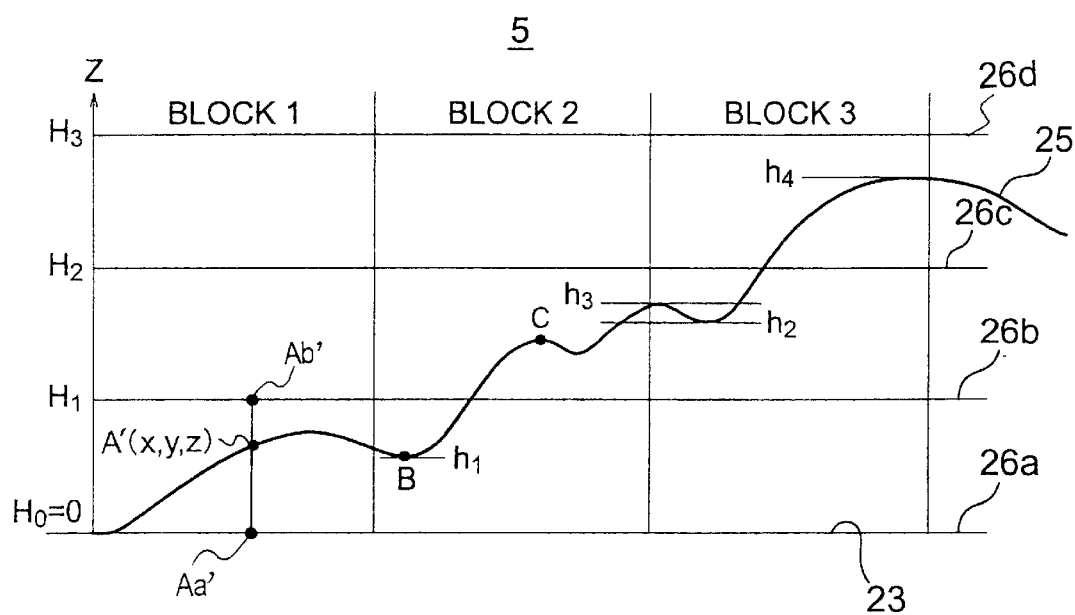
FIG. 1 is a schematic illustration showing an embodiment of an orthocorrection method according to the present invention for a satellite-acquired image.

In FIG. 1, signs 26a,26b,26c,26d indicate control planes, respectively.

In FIG. 1, a ground surface 25 is shown in cross-section, and the plural different control planes 26a,26b,26c,26d are set on a corrected image 5. The control plane 26a is set as a control plane of a zero elevation ($H_0$=0) of a reference rotating ellipsoidal ground surface model 23, the control plane 26b as a control plane of elevation $H_1$, the control plane 26c as a control plane of elevation $H_2$, and the control plane 26d as a control plane of elevation $H_3$. These elevations $H_0,H_1,H_2,H_3$ satisfy the following inequality: $H_0<H_1<H_2<H_3$. These elevations $H_1,H_2,H_3$ can each be set as desired.

FIG. 1 also shows blocks 1,2,3. In every block, bilinear functions are determined for the respective control planes. With respect to every control plane, a pixel position in an observed image, said pixel position corresponding to the pixel position of the control plane, is determined by using the corresponding one of these bilinear functions. Using a correlation between the thus-determined pixel positions on the respective control planes and the pixel positions in the observed image 4, a correlation between each pixel position on the ground surface 25 and its corresponding pixel position in the observed image 4 is determined. By these processing, distortions caused by the relief of the ground surface 25 are eliminated.

A description will hereinafter be made about these processing.

Figure 2:
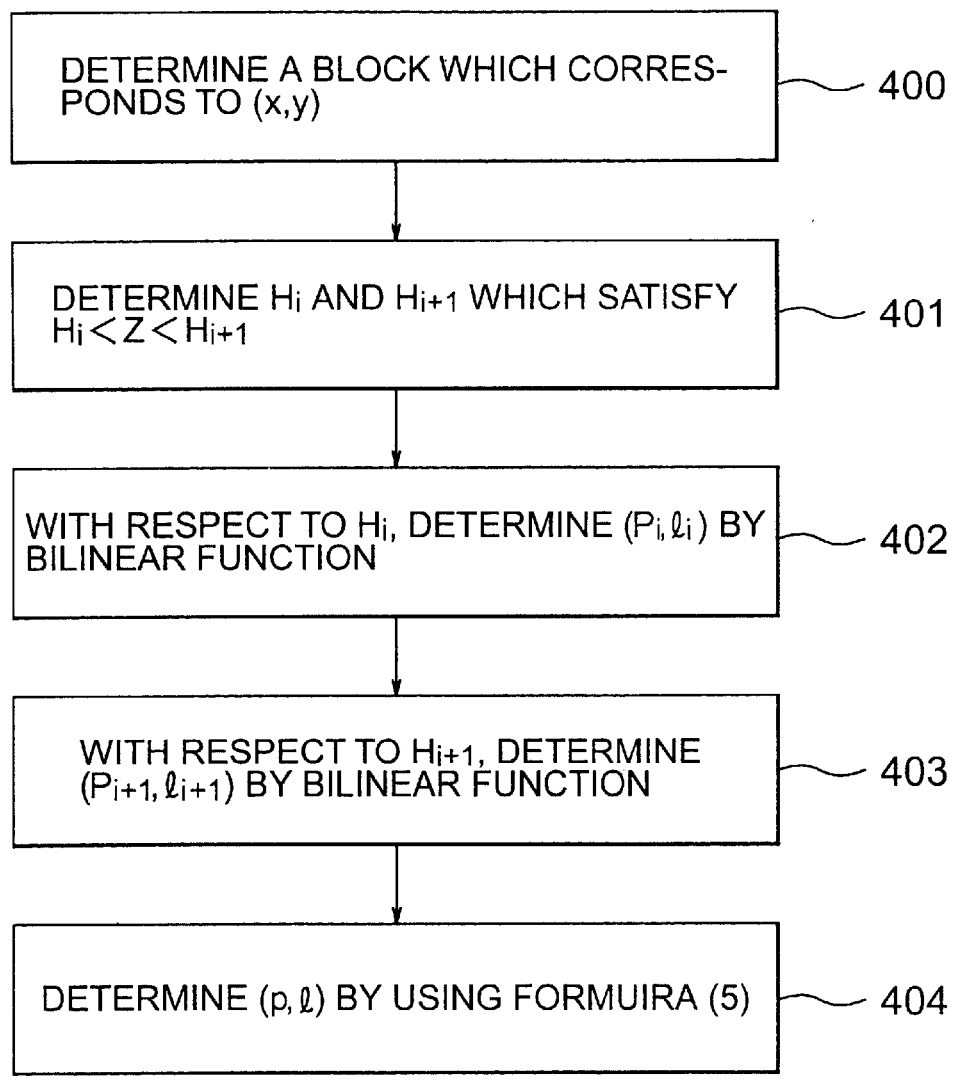
FIG. 2 is a flow chart illustrating correcting processing according to the embodiment shown in FIG. 1.
Figure 8:
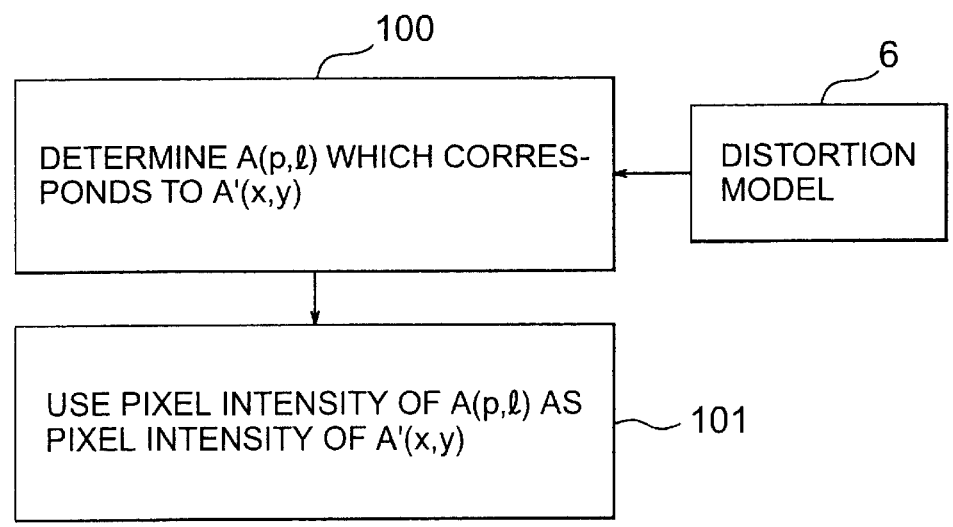
FIG. 8 is a flow chart illustrating processing for the correction of an observed image.
Figure 9:
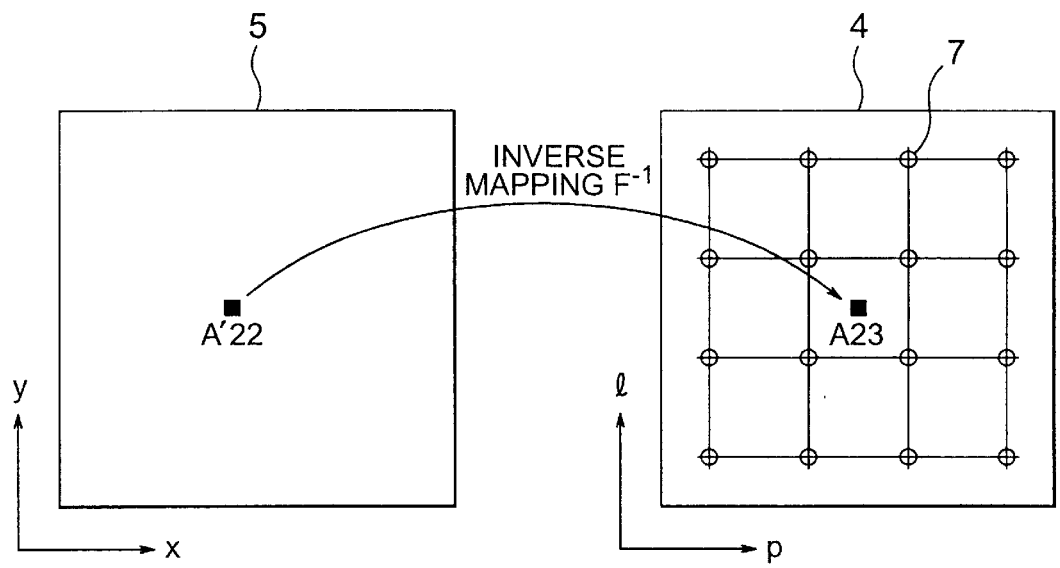
FIG. 9 is an illustration of a resampling step in FIG. 8.
Figure 10:
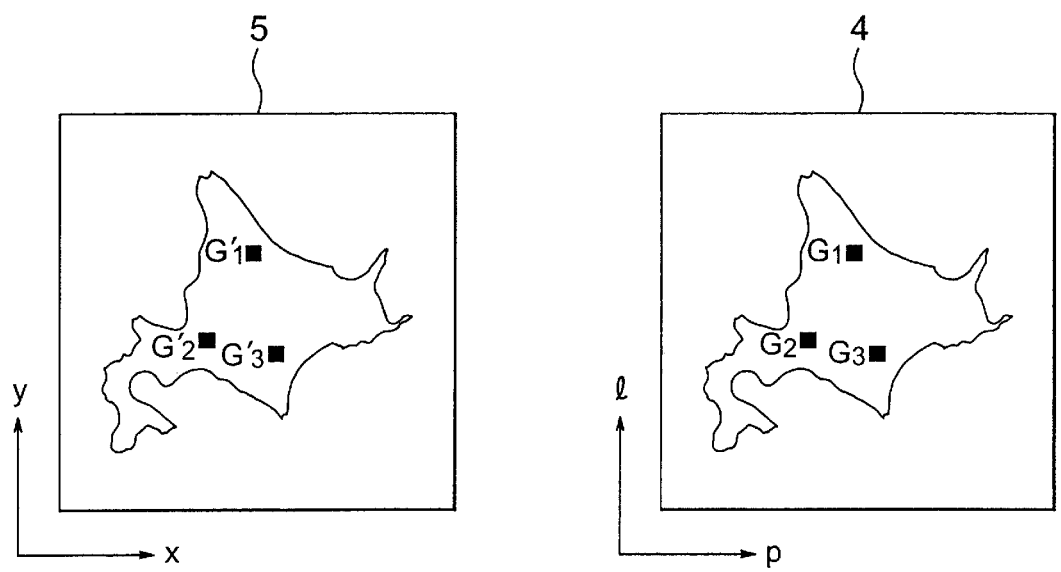
FIG. 10 is an illustration of a first correction method of an observed image, in which ground control points are used.
Figure 11:
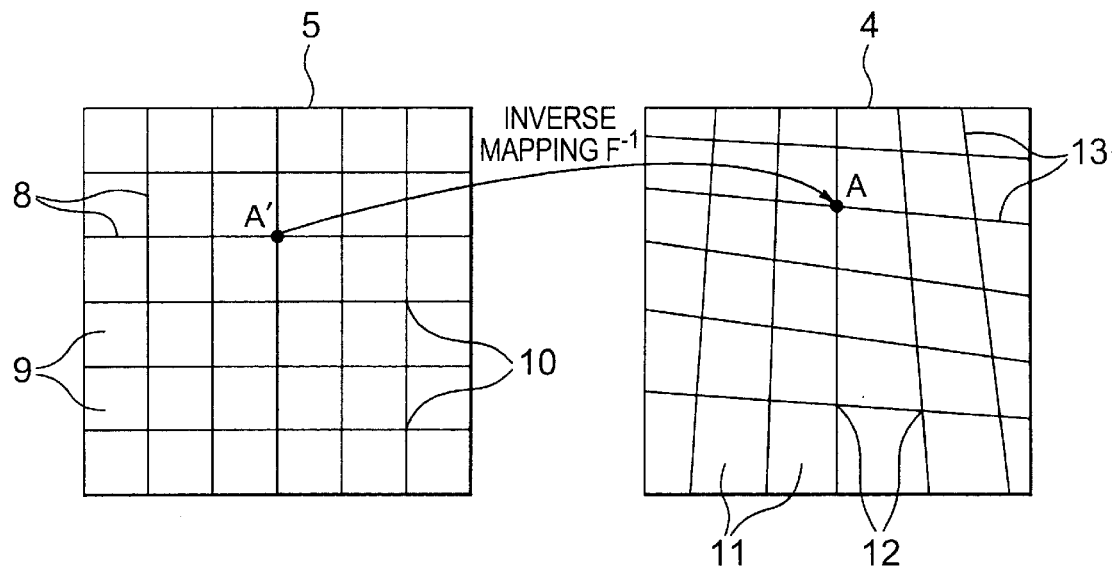
FIG. 11 is a view for describing lattice points and blocks in a second correction method of the observed image.

The flow chart of FIG. 2, which illustrates the correcting processing of this embodiment, corresponds to the distortion modeling processing step 100 in the correcting processing illustrated in FIG. 8.

In the corrected image 5, the plural control planes 26a–26d are set as shown in FIG. 1. Similarly to the above-described conventional art, blocks are set by lattices of equal intervals such that they correspond to these control planes, respectively. The corrected image is, therefore, divided into the blocks by the lattices of equal intervals.

Now, assume that the coordinates of a target pixel A' in the corrected image 4 can be expressed by (x,y,z), because the target pixel A' is located on the rolling ground surface 25 and has an elevation z defined by elevation data DEM.

In FIG. 2, based on the coordinates (x,y) of the target pixel A', its corresponding block is determined (step 400). In the case of FIG. 1, the block 1 is determined.

Based on the elevation z of the target pixel A', two control planes which directly sandwich the position of the target pixel A' above and below the position are determined next. When this elevation z is located between the control plane of an elevation $H_i$ (i=0,1,2, . . . ) and the control plane of an elevation $H_{i+1}$, namely, $$H_i<z<H_{i+1} \qquad (4)$$

control planes of elevations $H_i,H_{i+1}$ are determined. In the case of FIG. 1, the control plane 26a of the elevation $H_0$ and the control plane 26b of the elevation $H_1$ are determined (step 401). In the block 2, the control plane 26a of the elevation $H_0$ and the control plane 26b of the elevation $H_1$ are determined for a point B, and the control plane 26b of the elevation $H_1$ and the control plane 26c of the elevation $H_2$ are determined for a point C.

The coefficients $a_0,a_1,a_2,a_3,b_0,b_1,b_2,b_3$ in the bilinear functions represented by the formula (2) for the thus-determined control plane of the elevation $H_i$ are determined by a method to be described subsequently herein. Using bilinear functions with these coefficients used therein, a coordinate position $A_i(p_i,l_i)$ in the observed image 4, said coordinate position corresponding to a pixel position $A_i'(x_i,y_i)$ on the control plane of an elevation $H_i$, is determined (step 402). In a similar manner, a coordinate position $A_{i+1}(p_{i+1},l_{i+1})$ in the observed image 4, said coordinate position corresponding to a pixel position $A_{i+1}'(x_{i+1},y_{i+1})$ on the control plane of an elevation $H_{i+1}$, is determined. In the case of FIG. 1, a coordinate position $A_0(p_0,l_0)$ in the observed image 4, said coordinate position corresponding to a pixel position $A_0'(x_0,y_0,z_0)$ on the control plane 26_a of the elevation $H_0$, and a coordinate position $A_1(p_1,l_1)$ in the observed image 4, said coordinate position corresponding to a pixel position $A_1'(x_1,y_1,z_1)$ on the control plane 26b of the elevation $H_1$, are determined.

In the observed image 4, a coordinate position A(p, l) of the elevation z of the target pixel A' is next determined from the coordinate position $A_{i+1}$ and the coordinate position $A_1$ by performing linear interpolation in accordance with the following formula (5) (step 404):

$$l = \frac{H_{i+1} - z}{H_{i+1} - H_i} l_i + \frac{z - H_i}{H_{i+1} - H_i} l_{i+1} \qquad (5)$$

$$p = \frac{H_{i+1} - z}{H_{i+1} - H_i} p_i + \frac{z - H_i}{H_{i+1} - H_i} p_{i+1}$$

Figure 3:
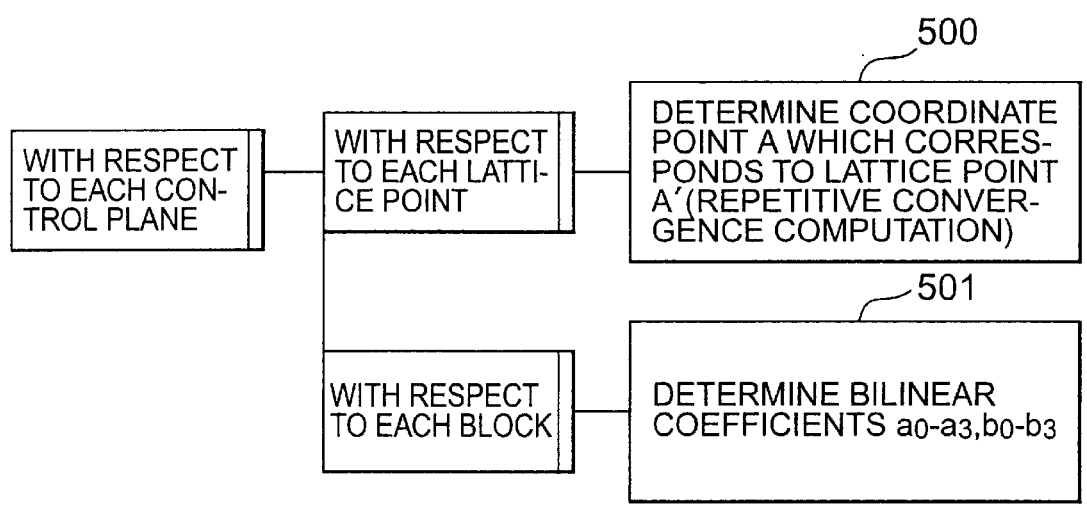
FIG. 3 is a flow chart illustrating a calculation method of coefficients in bilinear functions in steps 402,403 of FIG. 2.

Referring to FIG. 3, a description will be made of the calculation method of coefficients in bilinear functions in steps 402,403 of FIG. 2.

In FIG. 3, with respect to every one of the control planes of different elevations, the calculation described above in connection with FIG. 12 is performed. A lattice-point calculation step 500 is similar to the lattice-point calculation step 200 in FIG. 12, and a coefficient calculation step 501 is also similar to the coefficient calculation step 201 in FIG. 12.

Figure 13:
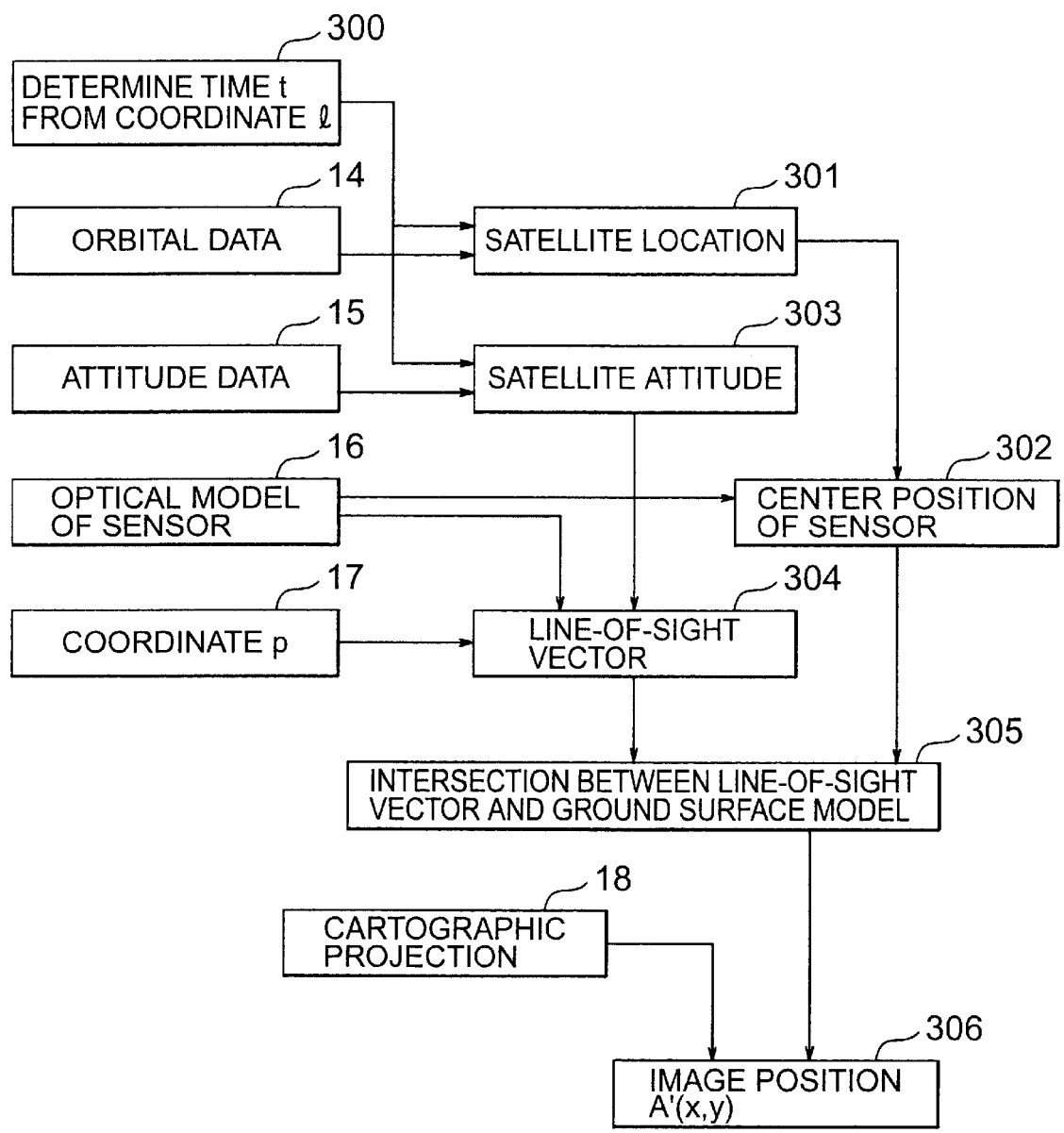
FIG. 13 is a flow chart illustrating a geometric calculation for mapping F in the lattice-point calculation step 200 in FIG. 12.
Figure 14:
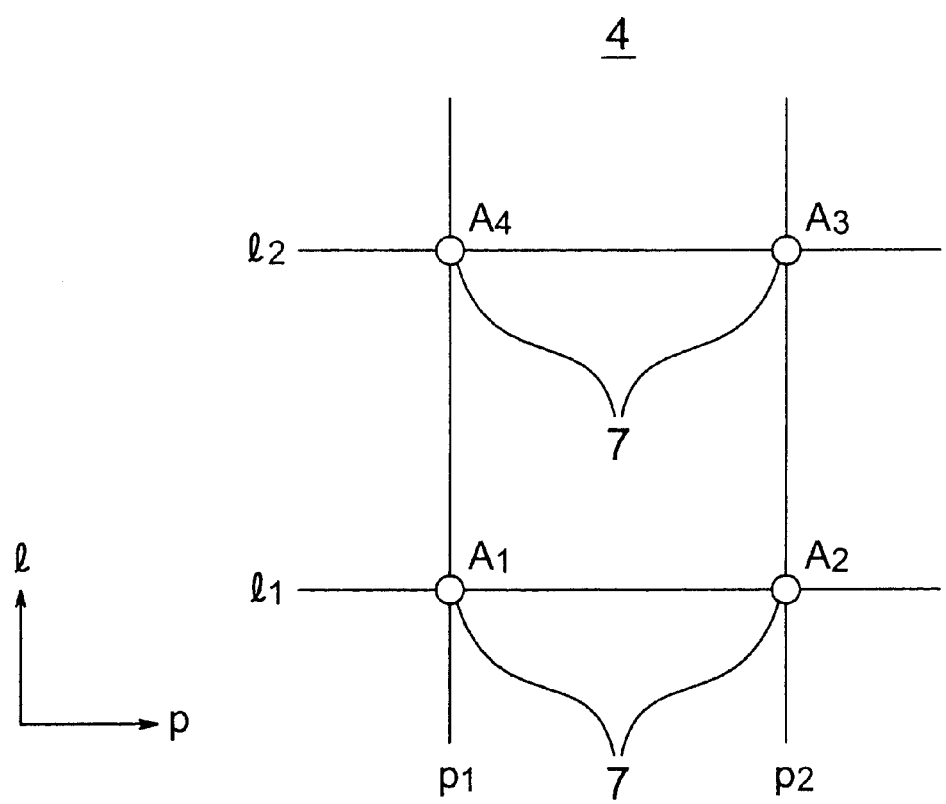
FIG. 14 is a view illustrating an array of some pixel positions in the observed image.
Figure 15:
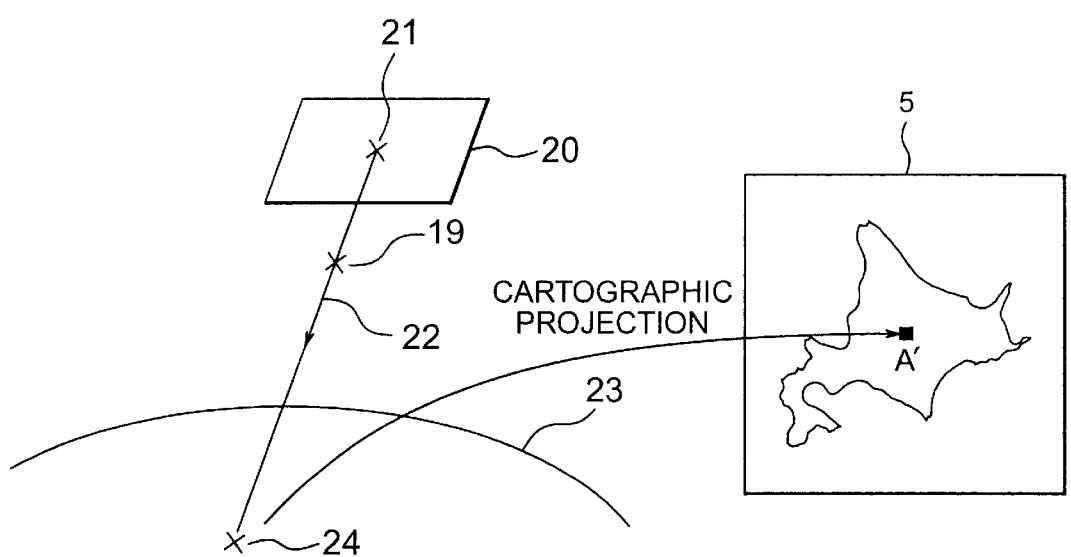
FIG. 15 is a simplified pictorial illustration of the geometric calculation for the mapping F in FIG. 13.
Figure 16:
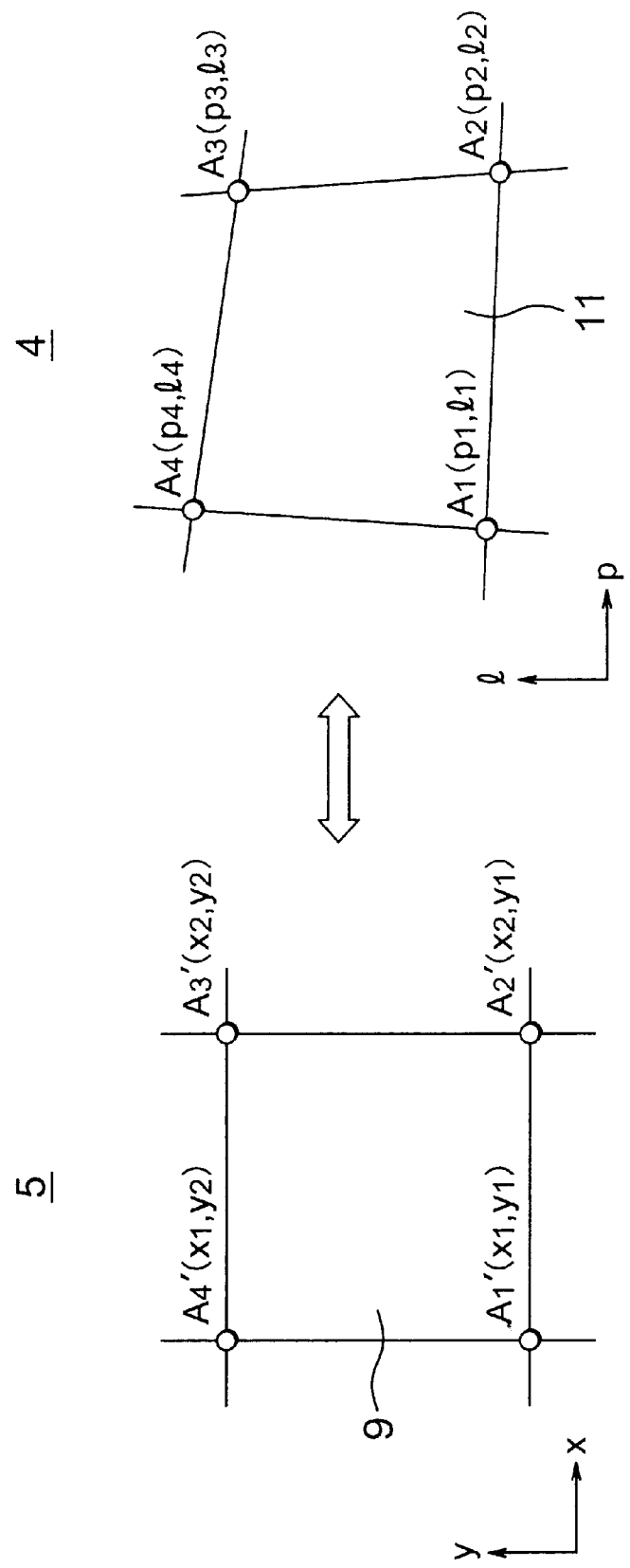
FIG. 16 is a view for illustrating a block-to-block relationship between a corrected image and an observed image.
Figure 17:
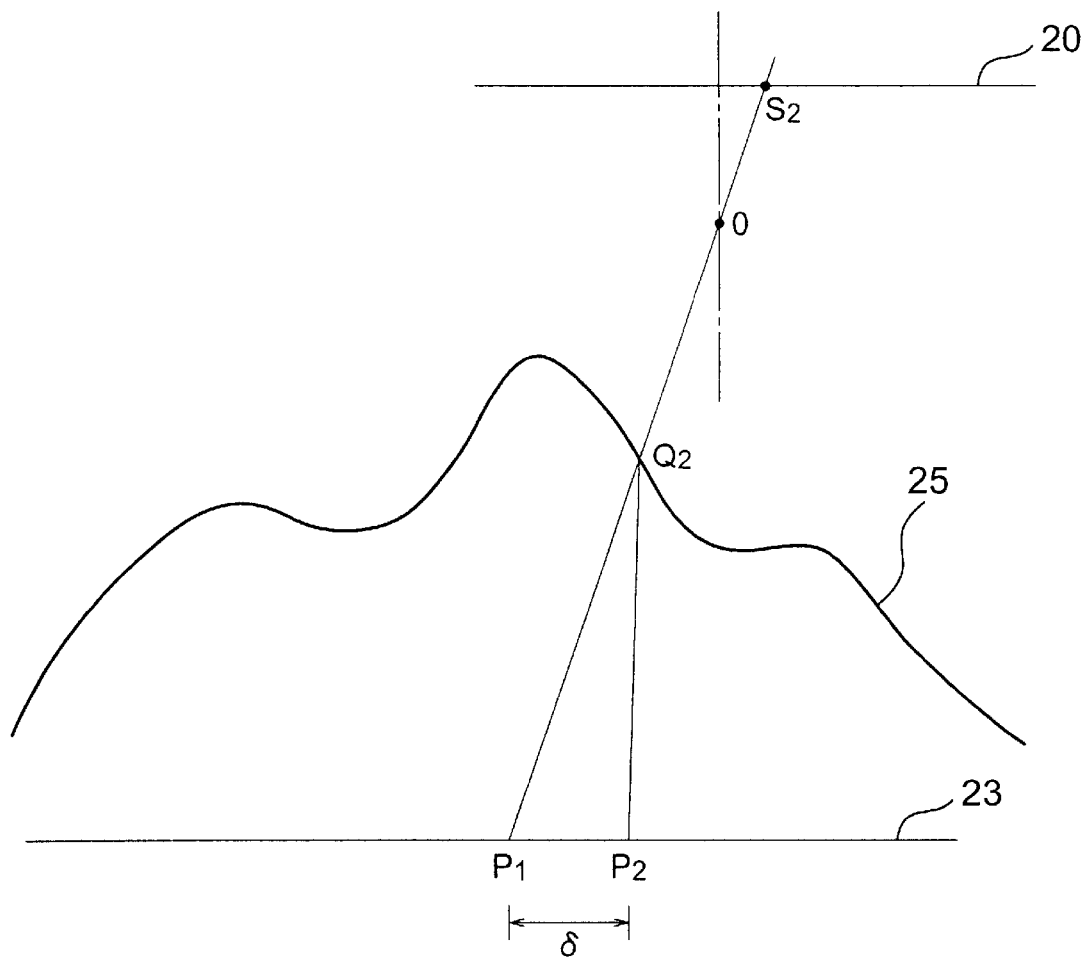
FIG. 17 is a view for illustrating a ground-relief-associated distortion due to a difference in elevation.

Geometric calculations for the mapping F in the lattice-point calculation step 500 are similar to those illustrated in FIG. 13. In the calculations shown in FIG. 3, however, the control plane on which each calculation is based is changed depending on the elevation $H_i$.

Figure 4:
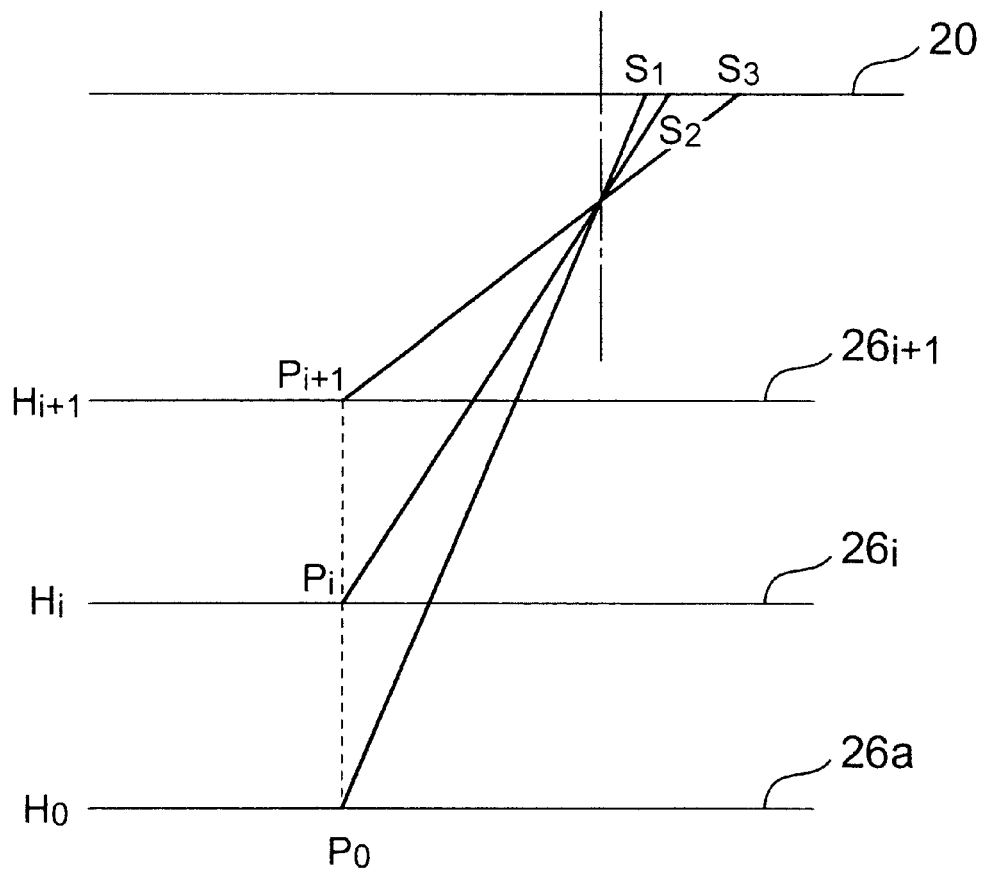
FIG. 4 is a diagram illustrating a lattice-point calculation step 500 in FIG. 3.

This will be described with reference to FIG. 4, in which control planes $26a, 26_i, 26_{i+1}$ of elevations $H_0, H_i, H_{i+1}$ in the same block of the corrected image 5 are shown. To a position $P_0$ on the control plane 26a, positions $P_i, P_{i+1}$ located on the control planes $26_i, 26_{i+1}$ at positions right above the position $P_0$ (in other words, positions identical in both latitude and longitude to the position $P_0$) correspond. Assuming that a cell on a sensor plane 20, said cell corresponding to the position $P_0$ on the control plane 26a is a cell $S_1$, a cell on the sensor plane 20, said cell corresponding to the position $P_i$ on the control plane $26_i$, is a cell $S_2$; and a cell on the sensor plane 20, said cell corresponding to the position $P_{i+1}$ on the control plane $26_{i+1}$, is a cell $S_3$.

As is readily appreciated from the foregoing description, different cells are used corresponding to control planes of different elevations even if points on these control planes are of the same latitude and longitude. Accordingly, processing for changing the cell depending on the control plane, that is, correction of the coordinates l,p in FIG. 13 is needed.

Figure 5:
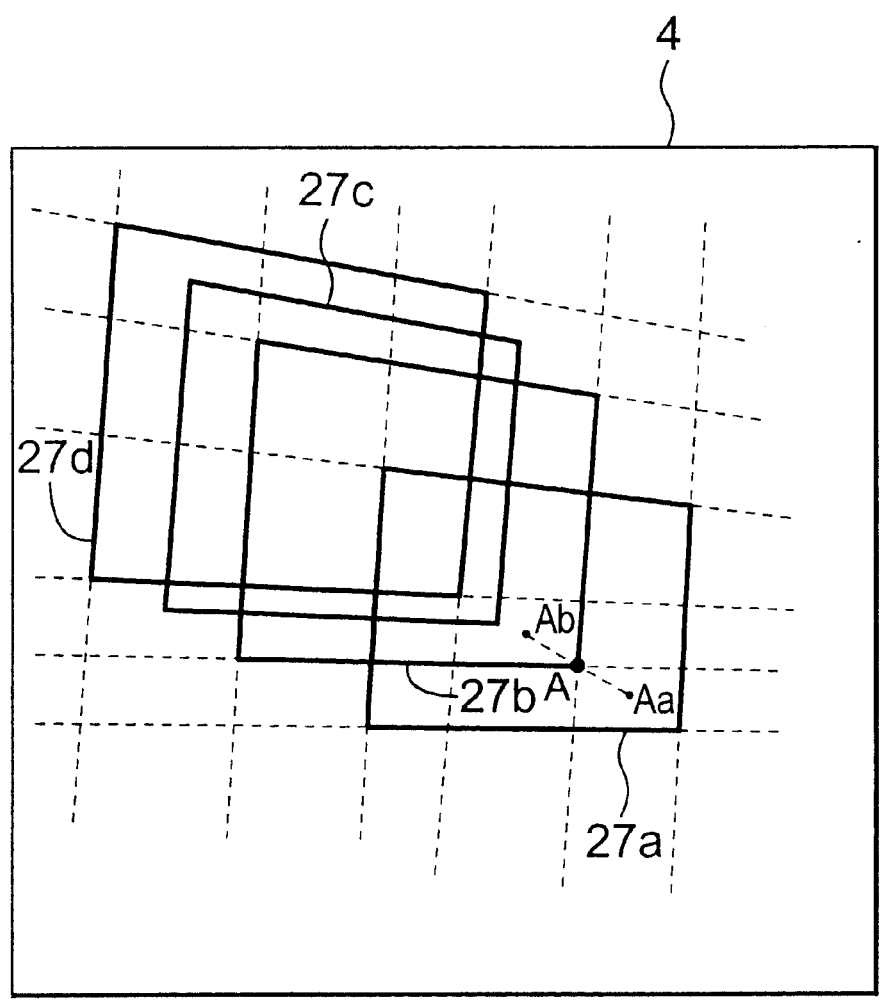
FIG. 5 is a diagram illustrating mapping of a lattice point onto plural control planes of different elevations in an observed image.
Figure 6:
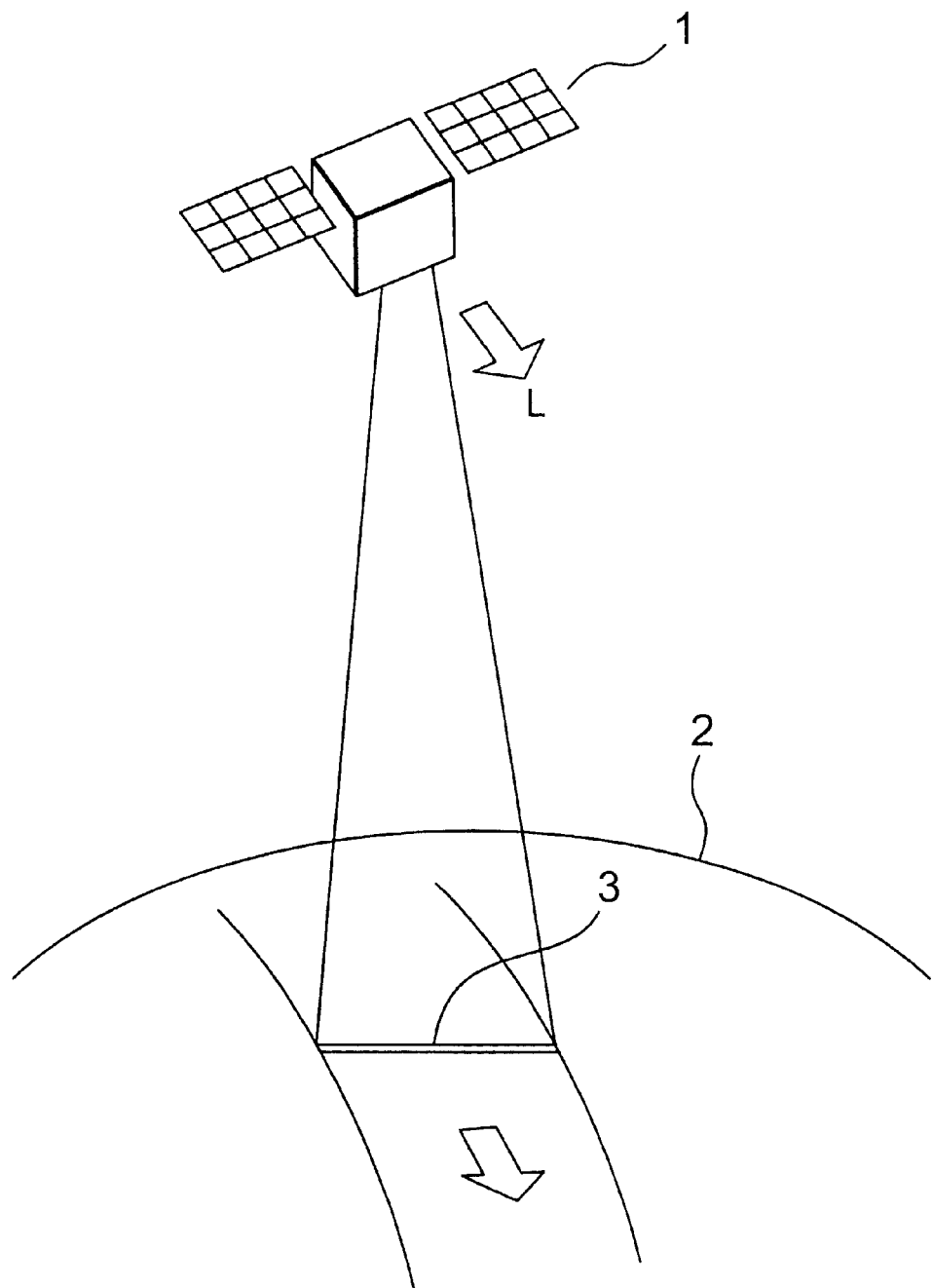
FIG. 6 is a simplified pictorial illustration of acquisition of an image by a satellite.
Figure 7:
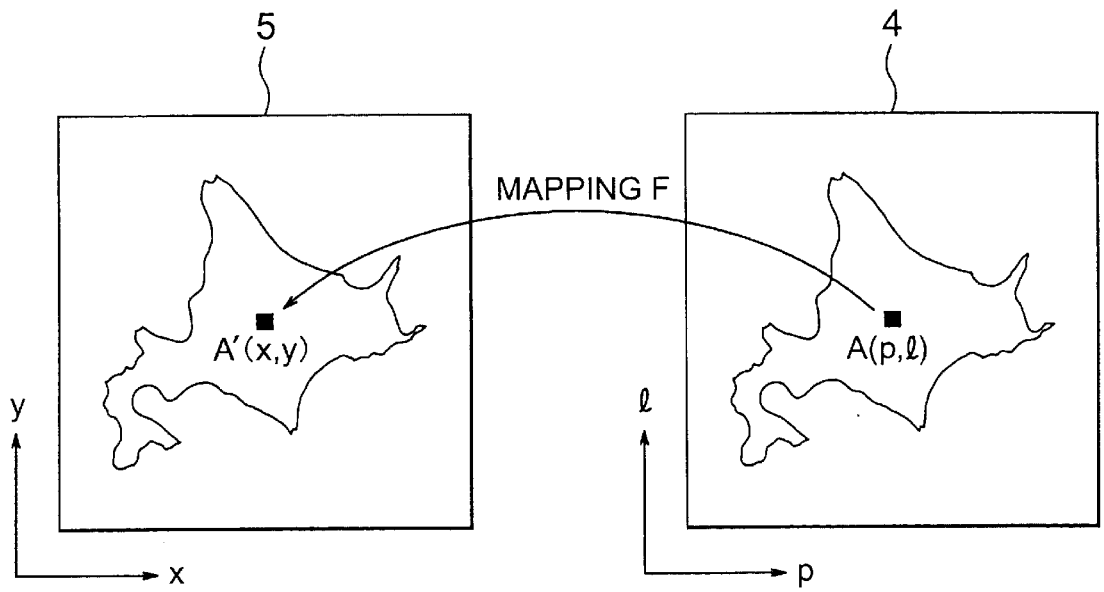
FIG. 7 is a view showing the principle of a correction of a satellite image.

Referring next to FIG. 5, mapping of a lattice point onto plural control planes of different elevations in an observed image 4 will be described. In the drawings, signs 27a,27b, 27c,27d designate blocks.

In FIG. 5, the block 27a corresponds to the block 1 in the region associated with the control plane 26a in FIG. 1, the block 27b corresponds to the block 1 in the region associated with the control plane 26b, the block 27c corresponds to the block 1 in the region associated with the control plane 26c, and the block 27d also corresponds to the block 1 in the region associated with the control plane 26d. As is understood from the foregoing description, even when the same block in the corrected image 5 is mapped into the observed image 4, the corresponding block in the observed image 4 differs depending on the control plane. This is attributed to the correction of the coordinate in the step 17 of FIG. 13 depending on its elevation in the lattice-point calculation step 500 in FIG. 3.

Figure 12:
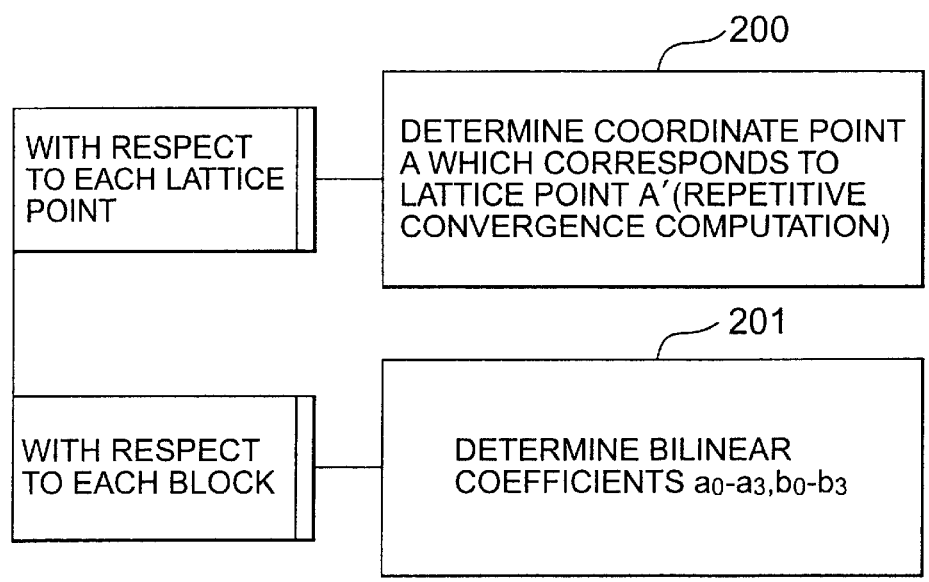
FIG. 12 is a flow chart illustrating a calculation method of coefficients in bilinear functions.

When the lattice-point positions of the respective control planes in the corrected image 5 and their corresponding pixel positions in the observed image 4 are determined in the lattice-point calculation step 500 as described above, the coefficients $a_0, a_1, a_2, a_3, b_0, b_1, b_2, b_3$ in the bilinear functions represented by the formula (2) are determined in connection with the blocks for the individual control planes, respectively, in a similar manner as in the coefficient calculation step 201 shown in FIG. 12. As a result, bilinear functions for the respective blocks associated with the individual control planes are obtained.

Now assume that it is desired to determine, for example, a pixel position A in the observed image 4, said pixel position corresponding to the pixel position A' of the elevation z in the block 1 of the corrected image 5 in FIG. 1. In the blocks 27a,27b (FIG. 5) in the observed image 4, said blocks corresponding to the block 1 associated with the control planes 26a and 26b between which the pixel position A' is directly sandwiched, a pixel position $A_a$ in the observed image 4, said pixel position corresponding to the pixel position $A_a'$ on the control plane 26a, is determined from the block 27a by the corresponding one of the thus-obtained bilinear functions, and a pixel position $A_b$ in the observed image 4, said pixel position corresponding to the pixel position $A_b'$ on the control plane 26b, is determined from the block 27b by the corresponding one of the thus-obtained bilinear functions. By performing interpolation, which corresponds to the elevation z of the pixel position A', between the thus-obtained pixel positions $A_a, A_b$, a pixel position A(p,l) in the observed image 4, said pixel position corresponding to the pixel position A'(x,y,z) in the corrected image 5, can be obtained.

Upon selecting the elevations $H_i$ of the control planes, it is preferred to take into consideration the following conditions:

(1) With respect to each block, to set a sufficient number of control planes of different elevations to cover an elevation data DEM range of from its minimum value to its maximum value in the block.

(2) In each adjacent two blocks, values of elevations of all control planes contained between a minimum control elevation value and a maximum control elevation value, which are greater and lower than a common range of elevation data DEM fluctuations in the adjacent two blocks, respectively, are set as values common to these adjacent two blocks such that a distortion model continues at a boundary between the adjacent two blocks.

The above condition (2) will next be described by taking, as an example, the blocks 2,3 in FIG. 1. A change in the elevation in the block 2 is from $h_1$ to $h_3$, while a change in the elevation in the block 3 is from $h_2$ to $h_4$. As $h_1 < h_2 < h_3 < h_4$, the range of elevation changes in the block 2 and the range of elevation changes in the block 3 overlap with each other in this elevation change range of from $h_2$ to $h_3$. This elevation change range of from $h_2$ to $h_3$ is "the common range of elevation data DEM fluctuations in the adjacent two blocks". Described specifically, "the minimum control elevation value greater than the common range of elevation data DEM fluctuations" is the elevation $H_2$, and "the maximum control elevation value smaller than the common range of elevation data DEM fluctuations" is the elevation $H_1$. When a control plane is set between such elevations $H_1$ and $H_2$, the elevation of the control plane must be set at the same value in the block 2 and the block 3.

Further, the intervals of the elevations $H_i$ in each block can be determined depending on the extent of elevation data DEM fluctuations in the block and the off-nadir angle (the magnitude of a perspective angle as measured from the sub-satellite point of the satellite 1) of the block.

Namely, an approximation error in a bilinear model and a linear approximation error in ground-relief-associated distortion amount relative to an elevation are acceptable provided that their sum falls within a permissible tolerance range of an error after the correction. In general, a ground-relief-associated distortion amount and its linear approximation error increase with a fluctuation in elevation within a block and also with a perspective angle. It is, therefore, necessary to make the intervals of the elevations $H_i$ smaller. These intervals can be determined by estimating this approximation error beforehand through a model calculation or the like.

What is claimed is:

1. A method for orthocorrecting a satellite-acquired image, including distortion modeling for making positions of pixels in a corrected image and positions of pixels in an observed image correspond to each other and also resampling for interpolating intensities of said pixels in said observed image in accordance with results of said distortion modeling, wherein said distortion modeling comprises the following steps:

(a) setting a plurality of control planes of different elevations relative to a control plane of a zero elevation of a reference rotating ellipsoidal earth model;

(b) dividing said corrected image into plural blocks by lattices of equal intervals;

(c) determining, with respect to each of said pixels in said corrected image, a corresponding one of said blocks;

(d) determining two of said control planes, said two control planes sandwiching an elevation value of said position of said pixel above and below said elevation value in the thus-determined block;

(e) calculating two pixel positions in said observed image, which correspond to said elevation value of said pixel position in said block, by using respective distortion model formulas determined as bilinear functions with respect to said two control planes;

(f) linearly interpolating the thus-calculated two pixel positions by said elevation value of said pixel position in said corrected image to determine said pixel position in said observed image, which corresponds to said pixel position in said corrected image; and (g) repeating said steps (c) to (f) until pixel positions in said observed image are all determined corresponding to said individual pixel positions in said corrected image.

2. A method according to claim 1, wherein:

in each of said blocks, a sufficient number of control planes of different elevations to cover a range of from a minimum value to a maximum value of elevation values of pixel positions in said block are set; and in each adjacent two of said blocks, values of elevations of all control planes contained between a minimum control elevation value and a maximum control elevation value, which are greater and lower than a common range of elevation value fluctuations in said adjacent two blocks, respectively, are used as common values in said adjacent two blocks.

* * * * *